US011464161B1

(12) United States Patent
Phanco

(10) Patent No.: US 11,464,161 B1
(45) Date of Patent: Oct. 11, 2022

(54) AUTOMATIC SENSITIVITY ADJUSTMENT FOR AN AUTONOMOUS MOWER

(71) Applicant: Hydro-Gear Limited Partnership, Sullivan, IL (US)

(72) Inventor: Eric S. Phanco, Plainfield, IN (US)

(73) Assignee: Hydro-Gear Limited Partnership, Sullivan, IL (US)

(*) Notice: Subject to any disclaimer, the term of this patent is extended or adjusted under 35 U.S.C. 154(b) by 273 days.

(21) Appl. No.: 16/831,612

(22) Filed: Mar. 26, 2020

Related U.S. Application Data

(60) Provisional application No. 62/826,685, filed on Mar. 29, 2019.

(51) Int. Cl.
*A01D 34/00* (2006.01)
*A01D 75/18* (2006.01)
*G05D 1/02* (2020.01)
*A01D 101/00* (2006.01)

(52) U.S. Cl.
CPC ......... *A01D 34/008* (2013.01); *A01D 75/185* (2013.01); *A01D 2101/00* (2013.01); *G05D 1/0259* (2013.01)

(58) Field of Classification Search
None
See application file for complete search history.

(56) References Cited

U.S. PATENT DOCUMENTS

| 6,611,738 | B2 | 8/2003 | Ruffner |
| 6,819,780 | B2 | 11/2004 | Benson et al. |
| 6,832,000 | B2 | 12/2004 | Herman et al. |
| 8,412,419 | B1 | 4/2013 | Seamon et al. |

(Continued)

FOREIGN PATENT DOCUMENTS

| EP | 2944174 | 11/2015 |
| JP | 2944774 | 9/1999 |
| WO | WO2018220528 | 12/2018 |

OTHER PUBLICATIONS

Chandler, et al., "Autonomous Agent Navigation Based on Textural Analysis," 2002 Florida Conference on Recent Advances in Robotics, 6 pp.
Chandler, et al., "Texture Analysis: A Technique for Autonomous Lawnmower Navigation," 2001 Florida Conference on Recent Advances in Robotics, 7 pp.
Chen, "Going Deeper with Convolutional Neural Network for Intelligent Transportation," Worcester Polytechnic Institute, Electronic Theses and Dissertations, Jan. 28, 2016, 70 pp.

(Continued)

*Primary Examiner* — Jeff A Burke
*Assistant Examiner* — Arslan Azhar
(74) *Attorney, Agent, or Firm* — Neal, Gerber & Eisenberg LLP

(57) ABSTRACT

Methods and apparatus are disclosed for automatic sensitivity adjustment for an autonomous mower. An exemplary mower includes a drive system and one or more cameras for capturing one or more images. One or more processors are configured to generate a grass value by applying a machine learning algorithm to the one or more images, instruct the drive system to maintain a current direction in response to determining that the grass value is greater than a mowing threshold, instruct the drive system to turn in response to determining that the grass value is less than or equal to the mowing threshold, determine a trigger rate that indicates how often the grass value is less than the mowing threshold within a predefined period of time, and decrease the mowing threshold by a predefined increment in response to determining that the trigger rate is greater than an upper threshold rate.

18 Claims, 4 Drawing Sheets

(56) References Cited

U.S. PATENT DOCUMENTS

| | | | |
|---|---|---|---|
| 8,666,550 | B2 | 3/2014 | Anderson et al. |
| 8,731,295 | B2 | 5/2014 | Schepelmann et al. |
| 8,958,939 | B2 * | 2/2015 | Einecke ............... G06V 20/10 |
| | | | 37/243 |
| 9,137,943 | B2 | 9/2015 | Einecke et al. |
| 9,188,980 | B2 | 11/2015 | Anderson |
| 9,349,187 | B2 | 5/2016 | Schepelmann et al. |
| 9,420,741 | B2 | 8/2016 | Balutis et al. |
| 9,603,300 | B2 | 3/2017 | Pettersson |
| 9,983,586 | B2 | 5/2018 | Borinato |
| 10,157,334 | B2 | 12/2018 | Schepelmann et al. |
| 2010/0236845 | A1 * | 9/2010 | Ishii ................. B60K 7/0007 |
| | | | 74/606 R |
| 2014/0215984 | A1 | 8/2014 | Bischoff |
| 2015/0163993 | A1 | 6/2015 | Pettersson |
| 2017/0303466 | A1 | 10/2017 | Grufman et al. |
| 2018/0329420 | A1 * | 11/2018 | Dong ................... A01D 34/008 |
| 2019/0179326 | A1 * | 6/2019 | Uemoto ............... G05D 1/0231 |
| 2019/0239427 | A1 * | 8/2019 | Aposhian ............. G05D 1/0223 |
| 2019/0239429 | A1 * | 8/2019 | Aposhian ............... A01D 34/66 |

OTHER PUBLICATIONS

Franzius, et al., "Embedded Robust Visual Obstacle Detection on Autonomous Lawn Mowers," Honda R&D Europe, Germany, 2017, 9 pp.

Guo, et al., "Vision-based Lawn Boundary Recognition for Mowing Robot," Advances in Computer Science Research, vol. 52, 2016 International Conference on Computer Engineering and Information Systems, 5 pp.

Holder, et al., "From On-Road to Off: Transfer Learning within a Deep Convolutional Neural Network for Segmentation and Classification of Off-Road Scenes," Computer Vision ECCV 2016 workshops: Amsterdam, The Netherlands, 15 pp.

LeCun, et al., "Gradient-Based Learning Applied to Document Recognition," Proc. Of the IEEE, Nov. 1998, 46 pp.

LeCun, et al., "Off-Road Obstacle Avoidance through End-to-End Learning," Advances In Neural Information Processing Systems, 2006, 8 pp.

Ulanoff, Review of iRobot Roomba 980 on mashable.com, Sep. 17, 2015, 19 pp.

* cited by examiner

AUTOMATIC SENSITIVITY ADJUSTMENT FOR AN AUTONOMOUS MOWER

CROSS-REFERENCE

This application claims the benefit of U.S. Provisional Patent App. No. 62/826,685, filed on Mar. 29, 2019. This prior application is incorporated by reference herein in its entirety.

FIELD OF THE INVENTION

This application relates to autonomous mowers, a category that includes tractors, landscaping machinery, and other lawn-maintenance vehicles.

BACKGROUND

The lawn mower industry continues to seek ways to ease users' physical burdens. Thus, lawn mowers have undergone an automation evolution, starting with self-propulsion, with recent developments signaling a movement towards unmanned (or autonomous) technology. These developments aim to purge physical labor from lawn mowing, at least as much as possible.

The typical autonomous lawn mower includes a navigation system, which helps the autonomous lawn mower travel about, and stay within the bounds of, a user's lawn. Commonly, a boundary wire emitting an electromagnetic field or pulse is sensed by the autonomous lawn mower to define the bounds of the user's lawn and to identify permanent obstacles such as trees or flower beds. The autonomous lawn mower executes an obstacle-avoidance maneuver when near the boundary wire, turning away from the boundary wire to remain within the area bounded by the boundary wire. Temporary obstacles and periodic changes in a lawn cannot be addressed by a boundary wire, however, without costly and time-consuming revisions to the boundary wire. Examples of temporary changes, and correspondingly, areas to be avoided by an autonomous lawn mower may include repaired patches of damaged grass, temporary lawn ornaments (seasonal), a work or excavation area, young tree or shrub plantings, and the like. The typical autonomous lawn mower relies on a collision or bump sensor to deal with unexpected obstacles that can damage the encountered obstacles or the autonomous lawn mower itself.

By comparison, a vision-based navigation system can address temporary obstacles and periodic changes in a lawn by analyzing, in real-time, the conditions in front of the lawn mower. At its most basic, an autonomous lawn mower vision system will include a camera, for example, that continually captures images as the lawn mower moves forward. The vision-based navigation system permits forward movement as long as images of an unobstructed lawn are being received and processed. Whenever the lawn mower approaches an obstacle that the lawn mower cannot or should not mow, the camera will capture an image of that obstacle and an image processor aboard the lawn mower will determine that the image data represent an obstacle. The image processor can be a dedicated processor in communication with a main processor responsible for directing movement of the lawn mower, or the main processor may also be enabled to process image data. As a result, the main processor will implement some change to the lawn mower's course. As it approaches the obstacle, the lawn mower might, for example, stop within one to three inches of the obstacle, reverse six inches, and then turn to the right so the lawn mower can restart its movement along a path that lacks the obstacle. This is but one of many obstacle-avoidance routines that may be programmed into the lawn mower's processor.

The vision-based navigation system's sensitivity can affect whether the system will detect an obstacle and/or an unobstructed lawn. For instance, when a portion of a lawn is completely uncovered, the vision-based navigation system may detect with a high level of confidence that the corresponding portion of the lawn is unobstructed. Further, when a portion of a lawn is thoroughly covered by objects (e.g., toys, tools, leaves, sticks, etc.), the vision-based navigation system may detect with a high level of confidence that the corresponding portion of the lawn is obstructed. When the lawn has dry grass, bare spots, and/or is partially covered (e.g., by leaves, twigs, etc.), the vision-based navigation system may have difficultly determining whether the lawn is uncovered or obstructed. Under such conditions, whether the lawn mower continues to move forward or changes direction depends on a sensitivity of the vision-based navigation system. Less sensitive vision-based navigation systems may be more likely to attempt to travel over obstructed terrain, and more sensitive vision-based navigation systems may be less likely to travel over traversable terrain.

The Detailed Description, below, and its accompanying drawings, will provide a better understanding of the invention and set forth embodiments that indicate the various ways in which the invention may be employed.

SUMMARY

An exemplary disclosed autonomous mower includes a drive system including one or more motors for propulsion and maneuvering. The exemplary disclosed autonomous mower also includes one or more blades for mowing, one or more cameras for capturing one or more images, and one or more processors. The one or more processors are configured to generate a grass value by applying a machine learning algorithm to the one or more images, instruct the drive system to maintain a direction of current movement for the autonomous mower based on a comparison between the grass value and a mowing threshold, instruct the drive system to adjust a velocity of current movement for the autonomous mower in response to determining that the grass value is less than or equal to the mowing threshold, determine a trigger rate that indicates how often the grass value is less than or equal to the mowing threshold within a predefined period of time, decrease the mowing threshold by a predefined increment in response to determining that the trigger rate is greater than an upper threshold rate, and increase the mowing threshold by a predefined increment in response to determining that the trigger rate is less than a lower threshold rate.

In some embodiments, the machine learning algorithm includes a convolutional neural network. In some embodiments, to adjust the velocity of current movement, the drive system is configured to turn away from the direction of current movement in response to the one or more processors determining that the grass value is less than or equal to the mowing threshold.

Some embodiments further include one or more bumper sensors. In some such embodiments, the drive system is configured to turn in response to at least one of the one or more bumper sensors contacting an adjacent object. Some embodiments further include a wire sensor configured to detect an electromagnetic field of a wire located along a boundary of a mowing area. In some such embodiments, the drive system is configured to turn in response to the wire sensor detecting the electromagnetic field of the wire.

In some embodiments, the one or more processors are configured to prevent the mowing threshold from decreasing below a minimum threshold level and prevent the mowing threshold from increasing above a maximum threshold level. Some embodiments further include a communication module that is configured to wirelessly communicate with a mobile device to receive a user-selected threshold.

An exemplary disclosed autonomous mower includes a drive system including one or more motors for propulsion and maneuvering. The exemplary disclosed autonomous mower also includes one or more blades for mowing, one or more cameras for capturing one or more images, and one or more processors. The one or more processors are configured to generate a non-grass value by applying a machine learning algorithm to the one or more images, instruct the drive system to maintain a direction of current movement for the autonomous mower based on a comparison between the non-grass value and a mowing threshold, instruct the drive system to adjust a velocity of current movement for the autonomous mower in response to determining that the non-grass value is greater than or equal to the mowing threshold, determine a trigger rate that indicates how often the non-grass value is greater than or equal to the mowing threshold within a predefined period of time, decrease the mowing threshold by a predefined increment in response to determining that the trigger rate is lower than a lower threshold rate, and increase the mowing threshold by a predefined increment in response to determining that the trigger rate is greater than an upper threshold rate.

In some embodiments, the machine learning algorithm includes a convolutional neural network. In some embodiments, to adjust the velocity of current movement, the drive system is configured to turn away from the direction of current movement in response to the one or more processors determining that the non-grass value is greater than or equal to the mowing threshold.

Some embodiments further include one or more bumper sensors. In some such embodiments, the drive system is configured to turn in response to at least one of the one or more bumper sensors contacting an adjacent object. Some embodiments further include a wire sensor configured to detect an electromagnetic field of a wire located along a boundary of a mowing area. In some such embodiments, the drive system is configured to turn in response to the wire sensor detecting the electromagnetic field of the wire.

In some embodiments, the one or more processors are configured to prevent the mowing threshold from decreasing below a minimum threshold level and prevent the mowing threshold from increasing above a maximum threshold level. Some embodiments further include a communication module that is configured to wirelessly communicate with a mobile device to receive a user-selected threshold.

An exemplary disclosed autonomous mower includes a drive system including one or more motors (e.g., a pair of motors) for propulsion and maneuvering. The exemplary disclosed autonomous mower also includes one or more blades for mowing, one or more cameras for capturing one or more images, and one or more processors. The one or more processors are configured to generate a grass value by applying a machine learning algorithm to the one or more images, instruct the drive system to maintain a current direction in response to determining that the grass value is greater than a mowing threshold, instruct the drive system to turn in response to determining that the grass value is less than or equal to the mowing threshold, determine a trigger rate that indicates how often the grass value is less than the mowing threshold within a predefined period of time, and decrease the mowing threshold by a predefined increment in response to determining that the trigger rate is greater than an upper threshold rate.

In some embodiments, the machine learning algorithm includes a convolutional neural network. In some embodiments, the drive system is configured to turn a randomly-selected degree in response to the one or more processors determining that the grass value is less than or equal to the mowing threshold.

Some embodiments further include one or more bumper sensors. In some such embodiments, the drive system is configured to turn in response to at least one of the one or more bumper sensors contacting an adjacent object. Some embodiments further include a wire sensor configured to detect an electromagnetic field (having a particular strength and frequency) of a wire located along a boundary of a mowing area. In some such embodiments, the drive system is configured to turn in response to the wire sensor detecting the electromagnetic field of the boundary wire. The boundary wire may be positioned above ground or underground (e.g. one to three inches deep).

In some embodiments, the one or more processors are configured to prevent the mowing threshold from decreasing below a minimum threshold level. In some embodiments, the one or more processors are configured to increase the mowing threshold by the predefined increment in response to determining that the trigger rate is less than a lower threshold rate. In some such embodiments, the one or more processors are configured to prevent the mowing threshold from increasing above a maximum threshold level.

Some embodiments further include a communication module that is configured to wirelessly communicate with a mobile device to receive a user-selected threshold. In some such embodiments, the one or more processors are configured to adjust the mowing threshold to the user-selected threshold as a manual override.

An exemplary disclosed method for operating an autonomous mower includes capturing image data via one or more vision sensors of the autonomous mower and generating, via one or more processors of the autonomous mower, a non-grass value by applying a machine learning algorithm to the image data. The exemplary disclosed method also includes steering, via a drive system, the autonomous mower to maintain a current direction in response to determining that the non-grass value is less than a mowing threshold and turning the autonomous mower, via the drive system, in response to determining that the non-grass value is greater than or equal to the mowing threshold. The exemplary disclosed method also includes determining, via the one or more processors, a trigger rate that indicates how often the non-grass value exceeds the mowing threshold within a predefined period of time and decreasing, via the one or more processors, the mowing threshold by a first predefined increment in response to determining that the trigger rate is less than a lower threshold rate.

In some embodiments, the machine learning algorithm includes a convolutional neural network. In some embodiments, turning the autonomous mower includes turning the autonomous mower a randomly-selected degree.

Some embodiments further include one or more bumper sensors of the autonomous mower and turning the autonomous mower, via the drive system, in response to at least one of the one or more bumper sensors contacting an adjacent object. Some embodiments further include monitoring, via a wire sensor of the autonomous mower, for an electromagnetic field of a wire located along a boundary of a mowing area and turning the autonomous mower, via the drive system, in response to the wire sensor detecting the electromagnetic field of the boundary wire.

Some embodiments further include preventing the mowing threshold from decreasing below a minimum threshold level. Some embodiments further include increasing the mowing threshold by a second predefined increment in response to determining that the trigger rate is greater than an upper threshold rate.

Some embodiments further include receiving, via a communication module of the autonomous mower, a user-selected threshold from a mobile device and adjusting the mowing threshold to the user-selected threshold as a manual override.

An exemplary disclosed autonomous mower includes a drive system including one or more motors for propulsion and maneuvering. The exemplary disclosed autonomous mower also includes one or more blades for mowing, one or more cameras for capturing one or more images, and one or more processors. The one or more processors are configured to generate a non-grass value by applying a machine learning algorithm to the one or more images, instruct the drive system to maintain a current direction of movement in response to determining that the non-grass value is less than a mowing threshold, instruct the drive system to turn in response to determining that the non-grass value is greater than or equal to the mowing threshold, determine a trigger rate that indicates how often the non-grass value exceeds the mowing threshold within a predefined period of time, and decrease the mowing threshold by a predefined increment in response to determining that the trigger rate is less than a lower threshold rate.

An exemplary disclosed method for operating an autonomous mower includes capturing image data via one or more vision sensors of the autonomous mower and generating, via one or more processors of the autonomous mower, a grass value by applying a machine learning algorithm to the image data. The exemplary disclosed method also includes steering, via a drive system, the autonomous mower to maintain a current direction in response to determining that the grass value is greater than a mowing threshold and turning the autonomous mower, via the drive system, in response to determining that the grass value is less than or equal to the mowing threshold. The exemplary disclosed method also includes determining, via the one or more processors, a trigger rate that indicates how often the grass value is less than the mowing threshold within a predefined period of time and decreasing, via the one or more processors, the mowing threshold by a first predefined increment in response to determining that the trigger rate is greater than an upper threshold rate.

An exemplary disclosed autonomous mower includes a drive system including one or more motors for propulsion and maneuvering. The exemplary disclosed autonomous mower also includes one or more blades for mowing, one or more cameras for capturing one or more images, and one or more processors. The one or more processors are configured to generate a grass value by applying an image recognition algorithm to the one or more images, instruct the drive system to maintain a current direction in response to determining that the grass value is greater than a mowing threshold, instruct the drive system to turn in response to determining that the grass value is less than or equal to the mowing threshold, determine a trigger rate that indicates how often the grass value is less than the mowing threshold within a predefined period of time, and decrease the mowing threshold by a predefined increment in response to determining that the trigger rate is greater than an upper threshold rate.

An exemplary disclosed autonomous mower includes a drive system including one or more motors for propulsion and maneuvering. The exemplary disclosed autonomous mower also includes one or more blades for mowing, one or more cameras for capturing one or more images, and one or more processors. The one or more processors are configured to generate a grass value by applying an image recognition algorithm to the one or more images, instruct the drive system to maintain a current direction of movement in response to determining that the grass value is greater than a mowing threshold, instruct the drive system to change the current direction of movement in response to determining that the grass value is less than or equal to the mowing threshold, determine a trigger rate that indicates how often the grass value is less than the mowing threshold within a predefined period of time, and decrease the mowing threshold by a predefined increment in response to determining that the trigger rate is greater than an upper threshold rate.

An exemplary disclosed autonomous mower includes a drive system including one or more motors for propulsion and maneuvering. The exemplary disclosed autonomous mower also includes one or more blades for mowing, one or more cameras for capturing one or more images, and one or more processors. The one or more processors are configured to generate a grass value by applying an image recognition algorithm to the one or more images, instruct the drive system to maintain a current speed in response to determining that the grass value is greater than a mowing threshold, instruct the drive system to change the current speed in response to determining that the grass value is less than or equal to the mowing threshold, determine a trigger rate that indicates how often the grass value is less than the mowing threshold within a predefined period of time, and decrease the mowing threshold by a predefined increment in response to determining that the trigger rate is greater than an upper threshold rate.

DETAILED DESCRIPTION

Figure 1:
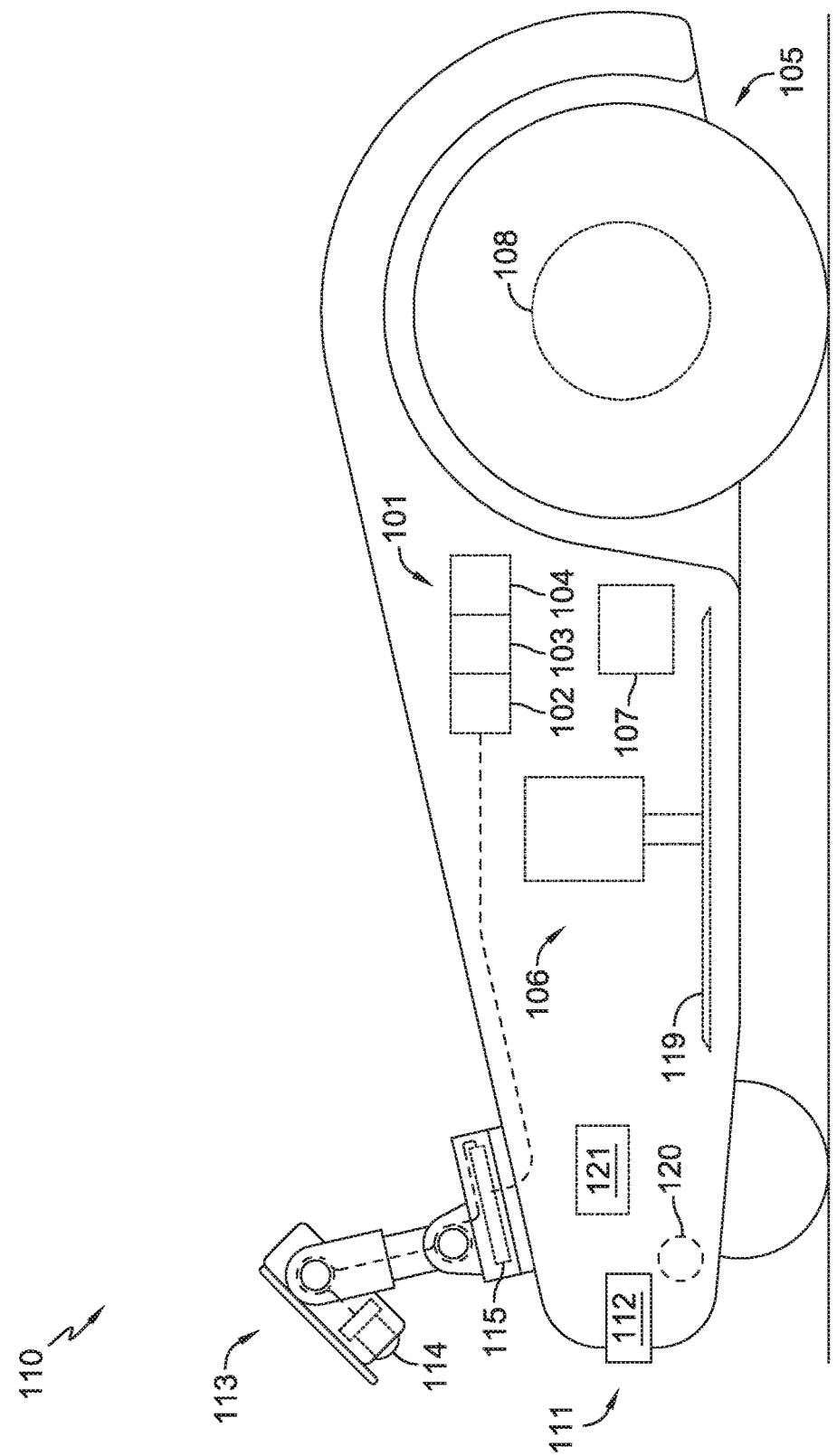
FIG. 1 is a side elevational view of an autonomous lawn mower embodiment featuring a vision assembly.

This description describes one or more embodiments and should not limit the invention to those embodiments. The description explains principles of the invention to enable one of ordinary skill in the art to understand and apply the principles to practice both the described embodiments and other embodiments that may come to mind. The invention's scope should cover all embodiments that might fall within the scope of the claims, either literally or under the doctrine of equivalents.

In general, an exemplary embodiment of the invention includes an autonomous lawn mower. As used herein, the terms "lawn mower" and "mower" refer to a device, machine, and/or vehicle that maintains an appearance and/or condition of terrain (e.g., a lawn, a field, a yard, a park, etc.) by cutting grass and/or other plants. Exemplary lawn mowers include residential lawn mowers, commercial lawn mowers, tractors, landscaping machinery, other lawn-maintenance vehicles, etc. The exemplary autonomous lawn mower disclosed herein includes a vision assembly that determines whether the area in front of the lawn mower is "mowable." In response to determining that the area is mowable, the lawn mower is configured to move forward. In response to determining that the area is unmowable, the lawn mower is configured to turn, change direction, change speed, and/or change velocity. As used herein, the term "mowable" refers to a condition of a terrain over which a lawn mower is able to travel and cut grass and/or other plants without damaging the lawn mower and/or object(s) located on the terrain. Exemplary mowable terrain includes uncovered grass, a combination of grass and small weeds, grass lightly covered by leaves and/or twigs, etc. As used herein, the term "unmowable" refers to a condition of a terrain over which a lawn mower is unable to travel and cut grass and/or other plants without damaging the lawn mower and/or object(s) located on the terrain. Exemplary unmowable terrain includes terrain covered by unmowable objects (e.g., chairs, toys, etc.), terrain heavily covered by leaves and/or sticks, etc.

Exemplary autonomous mowers disclosed herein are configured to (i) generate a grass value by feeding image data to an image-recognition algorithm, such as a machine learning algorithm (e.g., a convolutional neural network), and (ii) compare the grass value to the mowing threshold. If the grass value is greater than the mowing threshold, the autonomous mower determines that mowable terrain is in front of the autonomous mower and, thus, continues to move forward toward the mowable terrain. If the grass value is less than or equal to the mowing threshold, the autonomous mower determines that unmowable terrain is in front of the autonomous mower and, thus, performs an obstacle avoidance maneuver away from the unmowable terrain.

Exemplary methods and apparatuses disclosed herein enable an autonomous mower to automatically adjust a mowing threshold to dynamically calibrate a sensitivity of the autonomous mower. For example, when a portion of the lawn has dry grass, bare spots and/or is partially covered (e.g., by leaves, twigs, etc.), the autonomous mower may have difficulty determining with a high degree of confidence whether that portion of the lawn is mowable or unmowable. In such instances, whether the autonomous mower identifies the lawn as mowable or unmowable is affected by the mowing threshold. For example, increasing the mowing threshold decreases a likelihood that lawn is identified as mowable, and decreasing the mowing threshold increases a likelihood that lawn is identified as mowable. The exemplary autonomous mower decreases the mowing threshold upon determining that the mower is undesirably identifying unmowable terrain too frequently and increases the mowing threshold upon determining that it is undesirably identifying unmowable terrain too infrequently. That is, the exemplary autonomous mower is configured to dynamically recalibrate its sensitivity to improve its identification of mowable and unmowable terrain.

Referring to the figures, FIG. 1 includes a lawn mower 110 that is autonomous. As used herein, an "autonomous mower" refers to a mower that is capable of controlling its motive functions without direct driver input. The lawn mower 110 includes a vision assembly 113 that includes a vision sensor 114 and a vision processor 115. For example, as a drive system 105 propels and steers the lawn mower 110 about a lawn, the vision processor 115 receives data (e.g., image data) from the vision sensor 114 and extracts relevant information from the data for the application of internal, vision-based logic to identify objects or surfaces in front of the lawn mower 110. In the exemplary embodiment, the vision sensor 114 may comprise a two-dimensional (2D) camera, a three-dimensional (3D) camera, a 360-degree camera, a radar sensor, a Lidar sensor, an ultrasonic sensor, and/or any other sensor-type that is able to collect data of the terrain in front of the lawn mower 110. The vision processor 115 is communicatively coupled to the vision sensor 114 and is configured to receive the data collected by the vision sensor 114. The vision processor 115 is configured to perform one or more initial processing steps (for example, data normalization, dimensionality reduction, etc.) of the collected data before that data is analyzed to determine whether the lawn mower 110 is approaching mowable or unmowable terrain.

In some embodiments, the vision assembly 113 includes a plurality of vision sensors (e.g., in any combination of the exemplary types of vision sensors). For example, the vision assembly 113 may include two or more cameras that each capture images in front and/or to the side of the lawn mower 110. The vision assembly 113 may stitch images captured from different cameras together to form a single image of a surrounding area adjacent to lawn mower 110. For example, to stitch a plurality of images together, the vision processor 115 uses stitching software to identify object(s) within each of the collected images, match object(s) that are within a plurality of the collected images, calibrate the collected images with respect to each other, and blend the calibrated images together. Additionally or alternatively, the plurality of vision sensors may include a Lidar sensor to supplement a visible light camera. The Lidar sensor may be configured to continuously determine a distance between lawn mower 110 and an obstacle, for example, to facilitate the detection and/or identification of obstacles in low-light environments. In other embodiments, radar or an ultrasonic sensor may be used as a supplement or alternate to a visible light camera.

The vision processor 115 of the exemplary embodiment is communicatively coupled to a main board 101. In the exemplary embodiment, the main board 101 includes a main processor 102, a drive controller 103 for controlling a drive system 105, and a blade controller 104 for controlling a blade system 106. In other embodiments, the main board 101 includes the vision processor 115. The drive system 105 is configured to accelerate, decelerate, brake, turn, reverse, change direction, change speed, change velocity and/or perform other motive functions of the lawn mower 110. For example, the drive system 105 includes one or more drive motors 108 (e.g., a pair of motors) to propel the lawn mower 110 forward and/or backward and provide maneuverability of the lawn mower 110. Further, the blade system 106 includes one or more blades 119 for mowing grass and/or other plants. For example, the one or more blades 119 are rotated, braked, and/or shut off based on instructions from the blade controller 104.

In the exemplary embodiment, each of the vision processor 115, the main processor 102, the drive controller 103, and the blade controller 104 is formed of at least one chip capable of storing and executing instructions. For example, each of the vision processor 115, the main processor 102, the drive controller 103, and the blade controller 104 may combine any number of an ARM chip, a DSP, or GPU, among other processors. Further, in some embodiments, the vision processor 115, the main processor 102, the drive controller 103, and/or the blade controller 104 are integrally formed into a single processor or controller such that one processor or controller performs the functions of the vision processor 115, the main processor 102, the drive controller 103, and/or the blade controller 104.

Further, in the exemplary embodiment, the vision processor 115 and/or the main processor 102 uses an image recognition algorithm, such as a convolutional neural network and/or another machine learning model, to determine whether or not the lawn mower 110 is approaching mowable grass. That is, the lawn mower 110 uses a convolutional neural network and/or another image recognition algorithm to determine a grass value and/or a non-grass value. The grass value represents a likelihood that mowable grass is in front of the lawn mower 110, and the non-grass value represents a likelihood that unmowable terrain is in front of the lawn mower 110.

Image recognition algorithms are configured to detect object(s) within an image and/or characteristics of image(s). Machine learning models are a form of artificial intelligence (AI) that enable a system to automatically learn and improve from experience without being explicitly programmed by a programmer for a particular function. For example, machine learning models access data and learn from the accessed data to improve performance of a particular function. Exemplary types of machine learning models include decision trees, support vectors, clustering, Bayesian networks, sparse dictionary learning, rules-based machine learning, etc. Another type of machine learning model is an artificial neural network, which is inspired by biological neural networks. An artificial neural network includes a collection of nodes that are organized in layers to perform a particular function (e.g., to categorize an input). Each node is trained (e.g., in an unsupervised manner) to receive an input signal from a node of a previous layer and provide an output signal to a node of a subsequent layer. An exemplary type of artificial neural network is a convolutional neural network.

A convolutional neural network is a type of artificial neural network that includes one or more convolutional layers, one or more pooling layers, and one or more fully-connected layers to perform a particular function. For example, a convolutional neural network includes convolutional layer(s) and fully-connected layer(s) to categorize and/or identify object(s) within an image. Typically, the convolutional layer(s) are performed before the fully-connected layer(s).

A convolutional layer includes one or more filters (also known as kernels or feature detectors). Each filter is a weighted matrix (e.g., a 3×3 matrix, a 5×5 matrix, a 7×7 matrix). For example, a first element of the matrix has a weight of '1,' a second element of the matrix has a weight of '0,' a third element of the matrix has a weight of '2,' etc. Further, each filter is convolved across the length and width of an input image to generate a feature map corresponding to that filter. For example, the filter is convolved across a grid of pixels of the input image by computing a dot product between the weighted matrix of the filter and a numerical representation of a tile of pixels of the input image. A convolution refers to a mathematical combination of two functions to produce another function to express how one function affects another. Further, each filter is trained to detect a particular feature (e.g., a color-based feature, an edge-based feature, etc.) within the tiles of the input image. In turn, each feature map includes information for that particular feature within the input image. By convolving a filter across the input image, the convolutional layer is able to obtain identification information for a plurality of features while also reducing a size of the image being analyzed to increase processing speeds. Thus, because each filter of a convolutional layer generates a respective feature map, a convolutional layer with a plurality of filters generates a plurality of feature maps. Further, a subsequent convolutional layer receives the feature maps as input information to be analyzed.

A convolutional neural network also typically includes one or more pooling layer(s). In some embodiments, a convolutional neural network includes a pooling layer after each convolutional layer such that each pooling layer is connected to a preceding convolutional layer. In other embodiments, a convolutional neural network may include more or less pooling layers and/or may arrange the pooling layers differently relative to the convolutional layers. A pooling layer is a form of down-sampling that is configured to further reduce the size of the image being analyzed to further increase processing speeds. For example, a pooling layer partitions each feature map into a grid of non-overlapping sections. Each non-overlapping section includes a cluster of data points within the feature map. For example, each pool may consist of a 2×2 grid of data points. For each non-overlapping section, the pooling layer generates one value based on the corresponding data points. In some embodiments, the pooling layer includes max pooling in which the generated value is the highest value of the corresponding data points. In other embodiments, the pooling layer includes min pooling in which the generated value is the lowest value of the corresponding data points or average pooling in which the generated value is the average of the corresponding data points. Further, in some embodiments, a convolutional layer further includes one or more rectified linear unit (ReLU) layers to further reduce the size of the image being analyzed. A ReLU is a non-linear function that changes each negative value within a feature map to a value of '0.'

After the convolutional and pooling layers are performed, one or more fully-connected layers of the convolutional neural network are performed. The fully connected layer(s) are configured to identify features of and/or objects within the input image based on the information generated by the convolution and pooling layers. Each fully-connected layer includes a plurality of nodes. Each node is connected to each node or map value of the previous layer, and each connection to the previous layer has its own respective weight. Further, each node is trained (e.g., in an unsupervised manner) to provide an output signal to a node of subsequent layer. In some embodiments, the final fully connected layer generates a value representing a likelihood or certainty that a feature (e.g., mowable grass) is or is not present in the input image. Further, in some embodiments, the convolutional neural network back-propagates the corresponding uncertainty through the convolutional neural network to retrain and improve the convolutional neural network for subsequent input images. Convolutional neural networks are described in greater detail in "Gradient-Based Learning Applied to Document Recognition," which was published by LeCun et al. in *Proceedings of the IEEE* 86.11 (1998).

Further, the lawn mower 110 may include one or more other sensors to facilitate avoidance of unmowable surfaces. For example, the lawn mower 110 includes a collision assembly 111 for complementing the image-recognition system of the vision assembly 113. The collision assembly 111 includes one or more collision sensors 112 (sometimes referred to as bumper sensors) that are configured to detect a physical obstruction upon contact. Upon detecting an object, at least one of the one or more collision sensors 112 is configured to transmit a signal to the main processor 102. In some embodiments, the main processor 102 transmits a signal to (i) the blade controller 104 to stop rotation of the one or more blades 119 and/or (ii) the drive controller 103 to cause the lawn mower 110 to turn and/or otherwise move away from and/or perform another evasive maneuver away from the detected obstacle. Additionally or alternatively, the lawn mower 110 includes a wire sensor 120 (also referred to as a magnetic field sensor). The wire sensor 120 is configured to sense an electromagnetic field of a boundary wire defining a mowing area. In some embodiments, the wire sensor 120 includes one or more coils configured to detect the electromagnetic field of the boundary wire. Typically, a boundary wire is either staked in place above ground (at or near ground level) or is buried underground (e.g. one to three inches deep). Upon detecting the boundary wire, the wire sensor 120 is configured to transmit a signal to the main processor 102 and/or the drive controller 103 to cause the lawn mower 110 to turn and/or otherwise move away from the detected boundary wire and, thus, keep the lawn mower 110 within the predefined mowing area.

The lawn mower 110 of the exemplary embodiment also includes a communication module 121 that is configured to wirelessly communicate with a nearby mobile device (e.g., a smart phone, a wearable, a smart watch, a tablet, etc.). For example, the communication module 121 is configured to communicate with a mobile device of a user to receive user-selected settings for the autonomous system of the lawn mower 110. The communication module 121 includes hardware (e.g., processors, memory, storage, antenna, etc.) and software that enable wireless communication with a nearby mobile device. In the exemplary embodiment, the communication module 121 includes a wireless personal area network (WPAN) module and/or a wireless local area network (WLAN) that is configured to wirelessly communicate with a nearby mobile device via short-range wireless communication protocol(s).

In some embodiments, the communication module 121 is configured to implement the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group.

Additionally or alternatively, the communication module 121 is configured to wirelessly communicate via Wi-Fi®, Near Field Communication (NFC), ultra-wide band (UWB) communication, ultra-high frequency (UHF) communication, low frequency (LF) communication, and/or any other communication protocol that enables communication with a nearby mobile device. Further, in some embodiments, the communication module 121 includes wireless network interface(s) to enable communication with external networks. The external network(s) may be a public network, such as the Internet; a private network, such as an intranet; or combinations thereof, and may use a variety of networking protocols now available or later developed. For example, the communication module 121 may be configured to communicate with cellular networks, such as Global System for Mobile Communications (GSM), Universal Mobile Telecommunications System (UMTS), Long Term Evolution (LTE), Code Division Multiple Access (CDMA), etc.

In the exemplary embodiment, the lawn mower 110 includes a battery 107 as a power source. For example, the battery 107 is configured to power the vision assembly 113, the drive system 105, the blade system 106, the wire sensor 120, the collision assembly 111, the communication module 121, and/or any other electronic components of the lawn mower 110. The battery 107 may include a rechargeable lithium-ion battery, a nickel cadmium battery, a nickel metal hydride battery, a lead acid battery, and/or any other type of power source (e.g., a fuel cell).

In operation, the vision sensor 114 and/or another sensor of the vision assembly is configured to collect image data of an area in front of and/or to the side of the lawn mower 110. The vision processor 115 and/or the main processor 102 are configured to apply a machine learning algorithm (e.g., a convolutional neural network) and/or other image-recognition algorithm to the collected image data to generate a grass value that indicates a likelihood of mowable grass being in front of the lawn mower 110. That is, the image-recognition algorithm, such as a convolutional neural network, used by the vision processor 115 and/or the main processor 102, provides a grass value as an output upon processing the image data as input. The grass value is a numerical representation (e.g., a whole number, a percentage, a decimal, etc.) of a likelihood that the lawn mower 110 is approaching mowable terrain. Additionally or alternatively, the vision processor 115 and/or the main processor 102 are configured to generate a non-grass value by applying the image-recognition algorithm to the collected image data. The grass value is a numerical representation (e.g., a whole number, a percentage, a decimal, etc.) of a likelihood that the lawn mower 110 is approaching unmowable terrain.

Further, the vision processor 115 and/or the main processor 102 are configured to compare the grass value to a mowing threshold to determine how to autonomously steer the lawn mower 110. The mowing threshold represents a cutoff point that indicates whether mowable or unmowable terrain is in front of the lawn mower 110. For example, the vision processor 115 and/or the main processor 102 determine that mowable grass is in front of the lawn mower 110 in response to determining that the grass value is greater than the mowing threshold. In turn, the drive system 105 is configured to maintain a current travel direction of the lawn mower 110 upon receiving an instruction to do so from the vision processor 115 and/or the main processor 102. In contrast, the vision processor 115 and/or the main processor 102 determine that unmowable terrain is in front of the lawn mower 110 in response to determining that the grass value is less than or equal to the mowing threshold. In turn, the drive system 105 is configured to autonomously change a direction, speed, and/or velocity of current movement of the lawn mower 110 upon receiving an instruction to do so from the vision processor 115 or the main processor 102. In some embodiments, the drive system 105 is configured to turn the lawn mower 110 by a randomly-selected degree. In other embodiments, the drive system 105 is configured to turn the lawn mower 110 by a degree that corresponds with the grass value and/or a difference between the grass value and the mowing threshold.

The vision processor 115 and/or the main processor 102 are configured to automatically adjust the mowing threshold to adjust the autonomous system of the lawn mower 110. For example, if the vision processor 115 and/or the main processor 102 frequently determine that terrain in front of the lawn mower 110 is unmowable, the vision processor 115 and/or the main processor 102 lower the mowing threshold to reduce how often terrain is identified as unmowable. In contrast, if the vision processor 115 and/or the main processor 102 rarely determine that terrain in front of the lawn mower 110 is unmowable, the vision processor 115 and/or the main processor 102 raise the mowing threshold to increase how often terrain is identified as unmowable.

In the exemplary embodiment, the main processor 102 and/or the vision processor 115 are configured to determine a trigger rate of the lawn mower 110. In some embodiments, the trigger rate is determined based on how often the grass value is less than the mowing threshold within a predefined period of time. In other embodiments, the trigger rate is determined based on how often the lawn mower 110 has performed a turning and/or other evasive motion due to the detection of unmowable terrain within a predefined period of time. Further, the main processor 102 and/or the vision processor 115 are configured to use the trigger rate to determine whether to adjust the mowing threshold. For example, the main processor 102 and/or the vision processor 115 are configured to (i) decrease the mowing threshold by a predefined increment in response to determining that the trigger rate is greater than an upper threshold rate and/or (ii) increase the mowing threshold by a predefined increment in response to determining that the trigger rate is less than a lower threshold rate. That is, the upper threshold rate enables the main processor 102 and/or the vision processor 115 to determine whether unmowable terrain is being undesirably identified too frequently, and the lower threshold rate enables the main processor 102 and/or the vision processor 115 to determine whether unmowable terrain is being undesirably identified too infrequently. The upper threshold rate and the lower threshold rate may be initially set and/or adjusted via a graphical user interface (GUI) of the lawn mower 110 and/or via a mobile device in wireless communication with the communication module 121 of the lawn mower 110.

The predefined increment at which the mowing threshold is increased can be either the same as, or different from, the predefined increment at which the mowing threshold is decreased. Further, in some embodiments, the main processor 102 and/or the vision processor 115 are not allowed to (i) increase the mowing threshold above a maximum level threshold (to prevent the mowing threshold from being too restrictive) and/or (ii) decrease the mowing threshold below a minimum level threshold (to prevent the mowing threshold from being too permissive). Additionally or alternatively, the vision processor 115 and/or the main processor 102 are configured to adjust the mowing threshold to a user-selected threshold as manual override in response to the communication module 121 receiving the user-selected threshold from a mobile device of an operator.

In some embodiments, the rate at which the trigger rate is periodically calculated is less than that at which images are collected and processed. For example, the trigger rate is calculated less frequently than images are collected and processed to prevent the mowing threshold from being repeatedly adjusted too frequently. In an exemplary embodiment, images are captured by the vision sensor 114 and processed by the main processor 102 and/or the vision processor 115 at a rate of about 5 frames per second and 30 frames per second. Further, in an exemplary embodiment, the main processor 102 and/or the vision processor 115 are configured to (i) decrease the mowing threshold in response to detecting a trigger rate of 0.4 triggers per second over a predefined period of time (e.g., 30 seconds) and/or (ii) increase the mowing threshold in response to detecting a trigger rate of 0.1 triggers per second over the predefined period of time. In another exemplary embodiment, the main processor 102 and/or the vision processor 115 are configured to (i) decrease the mowing threshold in response to detecting between about 5 and 10 triggers in 1 minute and/or (ii) increase the mowing threshold in response to detecting about 5 triggers over a 5 minute period. That is, in some embodiments, the trigger rate is determined based on different time durations for determining whether to increase the mowing threshold and decrease the mowing threshold, respectively.

Additionally or alternatively, the vision processor 115 and/or the main processor 102 are configured to compare the non-grass value to a mowing threshold to determine how to autonomously steer the lawn mower 110. For example, the vision processor 115 and/or the main processor 102 determine that mowable grass is in front of the lawn mower 110 in response to determining that the non-grass value is less than the mowing threshold. In turn, the drive system 105 is configured to maintain a current travel direction of the lawn mower 110 upon receiving an instruction to do so from the vision processor 115 or the main processor 102. In contrast, the vision processor 115 and/or the main processor 102 determine that unmowable terrain is in front of the lawn mower 110 in response to determining that the non-grass value is greater than or equal to the mowing threshold. In turn, the drive system 105 is configured to autonomously change a direction, speed, and/or velocity of current movement of the lawn mower 110 upon receiving an instruction to do so from the vision processor 115 or the main processor 102. Further, the main processor 102 and/or the vision processor 115 are configured to determine whether to adjust the mowing threshold based on a trigger rate that indicates how often the non-grass value exceeds the mowing threshold within a predefined period of time. For example, the main processor 102 and/or the vision processor 115 are configured to (i) increase the mowing threshold by a predefined increment in response to determining that the trigger rate is greater than an upper threshold rate and/or (ii) decrease the mowing threshold by a predefined increment in response to determining that the trigger rate is less than a lower threshold rate.

Further, in some embodiments, the vision processor 115 and/or the main processor 102 are configured to autonomously steer the lawn mower 110 based on both the grass value and the non-grass value. For example, the vision processor 115 and/or the main processor 102 are configured to (i) maintain a current direction of the lawn mower 110 in response to determining that the grass value is greater than a first threshold, (ii) change a direction, speed, and/or velocity of current movement of the lawn mower 110 to perform an obstacle avoidance routine in response to determining that the non-grass value is greater than a second threshold, and/or (iii) decelerate the lawn mower 110 in response to determining that both the grass value and the non-grass value are less than a third threshold.

The main processor 102 of the exemplary embodiment also is configured to change a direction, speed, and/or velocity of current movement of the lawn mower 110 to perform obstacle avoidance routines based on other sensors of the lawn mower 110. For example, the main processor 102 is configured to instruct the drive system 105 to change a direction, speed, and/or velocity of current movement of the lawn mower 110 in response to (i) at least one of the one or more collision sensors 112 detecting an adjacent object and/or (ii) the wire sensor 120 detecting an electromagnetic field of a wire located along a boundary of a mowing area.

Figure 2:
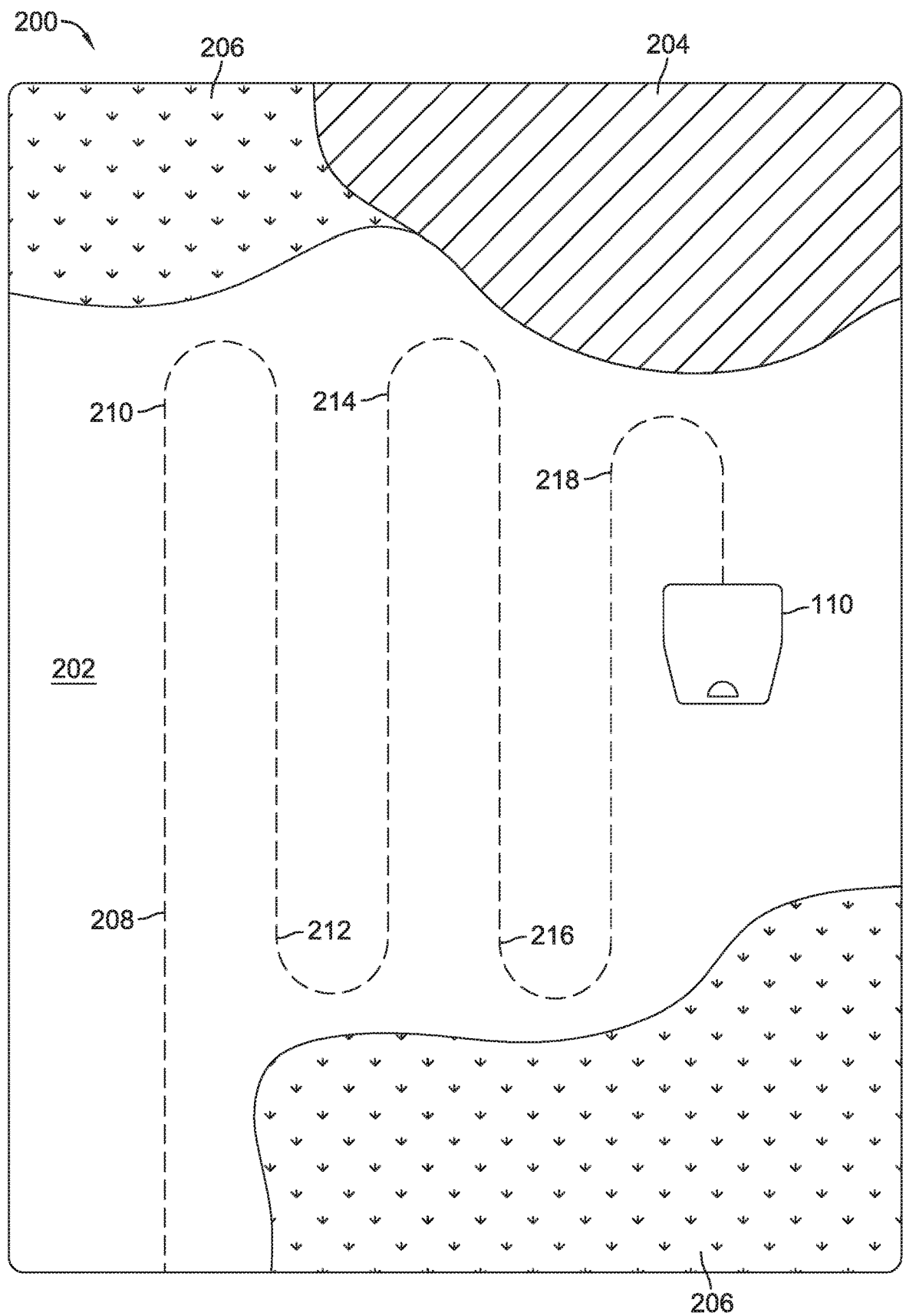
FIG. 2 is a diagram of the autonomous lawn mower of FIG. 1 mowing a lawn.

Turning to FIG. 2, the lawn mower 110 is located within an exemplary lawn 200. In the exemplary embodiment, portions of the lawn 200 include uncovered grass 202, fully covered grass 204, and dry or partially covered grass 206. For example, the uncovered grass 202 is completely uncovered, the covered grass 204 is completely covered by objects (e.g., leaves, twigs, etc.), and the dry or partially covered grass 206 includes dry grass and/or grass that is partially covered by objects (e.g., leaves, twigs, etc.).

Further, as depicted in FIG. 2, the lawn mower 110 has travelled within the lawn 200 along a path 208. As the lawn mower 110 travels across the lawn 200, the vision processor 115 and/or the main processor 102 perform image recognition to determine whether approaching terrain is mowable or unmowable. For example, at each point along the path 208, the vision processor 115 and/or the main processor 102 (i) generate a grass value and/or non-grass value, (ii) compare the value(s) to mowing threshold(s), and (iii) maintain or adjust the path 208 of the lawn mower 10 based on the comparison(s). Further, the vision processor 115 and/or the main processor 102 continuously and/or periodically determine a trigger rate based on how often the path 208 of the lawn mower 110 is adjusted.

In the exemplary embodiment, the lawn mower 110 reaches point 210 in the lawn 200 in front of the dry or partially covered grass 206. For example, the vision processor 115 and/or the main processor 102 (i) generate a grass value based on an image of the dry or partially covered grass 206 captured by the vision sensor 114, (ii) compare the grass value to the mowing threshold, and (iii) instruct the drive system 105 to turn the lawn mower 110 upon determining that the grass value is less than the mowing threshold. Further, the vision processor 115 and/or the main processor 102 also increase the trigger rate if the number of times unmowable terrain has been detected within a predefined period of time has increased.

Further, the lawn mower 110 performs the same grass value determination, mowing threshold comparison, and trigger rate calculation at (i) point 212 in front of the dry or partially covered grass 206, (ii) point 214 in front of the fully covered grass 204 and the dry or partially covered grass 206, (iii) point 216 in front of dry or partially covered grass 206, and (iv) point 218 in front of the fully covered grass 204. At each of the points 210, 212, 214, 216, 218, the vision processor 115 and/or the main processor 102 determine that the corresponding grass value is less than or equal to the mowing threshold. In turn, at each of the points 210, 212, 214, 216, 218, the vision processor 115 and/or the main processor 102 instruct the drive system 105 to turn the lawn mower 110 away from the fully covered grass 204 and/or the dry or partially covered grass 206.

In the exemplary embodiment, after the lawn mower 110 has turned at point 218, the trigger rate has increased to be above an upper threshold rate. In turn, the main processor 102 decreases the mowing threshold by a predefined increment. If the mowing threshold is decreased to a level that is less than the grass value associated with the dry or partially covered grass 206, the vision processor 115 and/or the main processor 102 of the lawn mower 110 will instruct the drive system 105 to drive and mow through the upcoming portion of the dry or partially covered grass 206.

Figure 3:
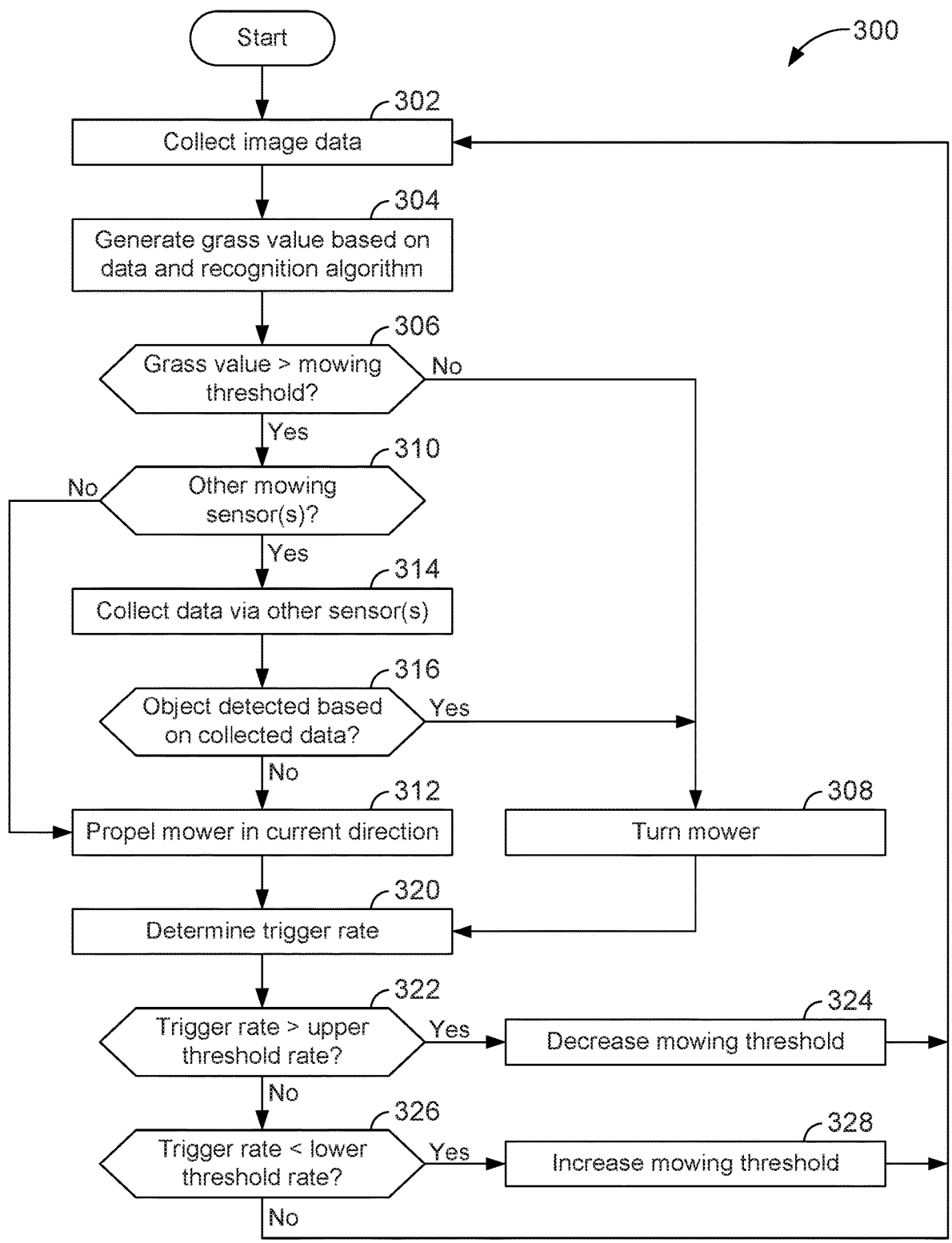
FIG. 3 is an exemplary process that the autonomous lawn mower of FIG. 1 executes to automatically adjust a sensitivity for steering purposes.

FIG. 3 is a flowchart of an exemplary method 300 to automatically adjust sensitivity of an image-recognition system of an autonomous mower. The flowchart is representative of machine readable instructions that are stored in memory and include one or more programs that, when executed by a processor (such as the main processor 102, the drive controller 103, the blade controller 104, and/or the vision processor 115 of FIG. 1), cause the autonomous mower to perform in accordance with method 300. While the exemplary program is described with reference to the flowchart illustrated in FIG. 3, many other methods of automatically adjusting sensitivity of an image-recognition system of an autonomous mower may alternatively be used. For example, the order of execution of the blocks may be rearranged, changed, eliminated, or combined to perform these alternate methods. Because the exemplary method 300 is disclosed in connection with the components of FIG. 1, some functions of those components will not be described in detail below.

Initially, at block 302, the vision sensor 114 and/or another sensor of the vision assembly collect image data of an area in front of and/or to the side of the lawn mower 110. At block 304, the vision processor 115 and/or the main processor 102 generate a grass value based on the collected image data. For example, the vision processor 115 and/or the main processor 102 submit the collected image data to a convolutional neural network and/or other image-recognition algorithm (e.g., another machine learning algorithm). For example, the grass value may be a whole number, a percentage, a decimal, or any other numerical representation that indicates a likelihood that mowable grass is in front of the lawn mower 110.

At block 306, the vision processor 115 and/or the main processor 102 compare the grass value to a mowing threshold. In response to the vision processor 115 and/or the main processor 102 determining that the grass value is not greater than (i.e., is less than or equal to) the mowing threshold, the method 300 proceeds to block 308, at which the drive system 105 autonomously turns the lawn mower 110 in a different direction. Upon completing block 308, the method 300 proceeds to block 320. Otherwise, returning to block 306, the method 300 proceeds to block 310 in response to the vision processor 115 and/or the main processor 102 determining that the grass value is greater than the mowing threshold.

At block 310, the main processor 102 identifies whether the lawn mower 110 includes other sensor(s) for monitoring a surrounding area of the lawn mower 110. In response to the main processor 102 identifying that the lawn mower 110 does not include another such sensor, the method 300 proceeds to block 312, at which the drive system 105 autonomously propels the lawn mower 110 in its current direction (e.g., via the one or more drive motors 108). Upon completing block 312, the method 300 proceeds to block 320. Otherwise, in response to the main processor 102 identifying that the lawn mower 110 includes other such sensor(s) (e.g., the one or more collision sensors 112, the wire sensor 120, etc.), the method 300 proceeds to block 314.

At block 314, the main processor 102 collects data from those other sensor(s). At block 316, the main processor 102 determines whether an object in front of the lawn mower 110 or a boundary of a lawn is detected based on the other collected data. In response to the main processor 102 detecting an object or a lawn boundary, the method 300 proceeds to block 308, at which the drive system 105 autonomously turns the lawn mower 110 in a different direction. Upon completing block 308, the method 300 proceeds to block 320. Otherwise, in response to the main processor 102 not detecting an object or an outer lawn boundary, the method 300 proceeds to block 312, at which the drive system 105 autonomously propels the lawn mower 110 in its current direction (e.g., via the one or more drive motors 108). Upon completing block 312, the method 300 proceeds to block 320.

At block 320, the main processor 102 and/or the vision processor 115 determine a trigger rate of the lawn mower 110. For example, the trigger rate indicates (i) how often the grass value exceeds the mowing threshold and/or (ii) how often the lawn mower 110 performs a turning and/or other obstacle avoidance motion due to the detection of unmowable terrain within a predefined period of time.

At block 322, the main processor 102 and/or the vision processor 115 determine whether the trigger rate is greater than an upper threshold rate. In response to the main processor 102 and/or the vision processor 115 determining that the trigger rate is greater than the upper threshold rate, the method 300 proceeds to block 324, at which the main processor 102 and/or the vision processor 115 decrease the mowing threshold (e.g., by a predefined increment). Upon completing block 324, the method 300 returns to block 302. Otherwise, returning to block 322, the method 300 proceeds to block 326 in response to the main processor 102 and/or the vision processor 115 determining that the trigger rate is not greater than (i.e., is less than or equal to) the upper threshold rate.

At block 326, the main processor 102 and/or the vision processor 115 determine whether the trigger rate is less than a lower threshold rate. In response to the main processor 102 and/or the vision processor 115 determining that the trigger rate is less than the lower threshold rate, the method 300 proceeds to block 328, at which the main processor 102 and/or the vision processor 115 increase the mowing threshold (e.g., by a predefined increment). Upon completing block 328, the method 300 returns to block 302. Otherwise, returning to block 326, the method 300 returns to block 302 without adjusting the mowing threshold in response to the main processor 102 and/or the vision processor 115 determining that the trigger rate is not less than (i.e., is greater than or equal to) the lower threshold rate.

Figure 4:
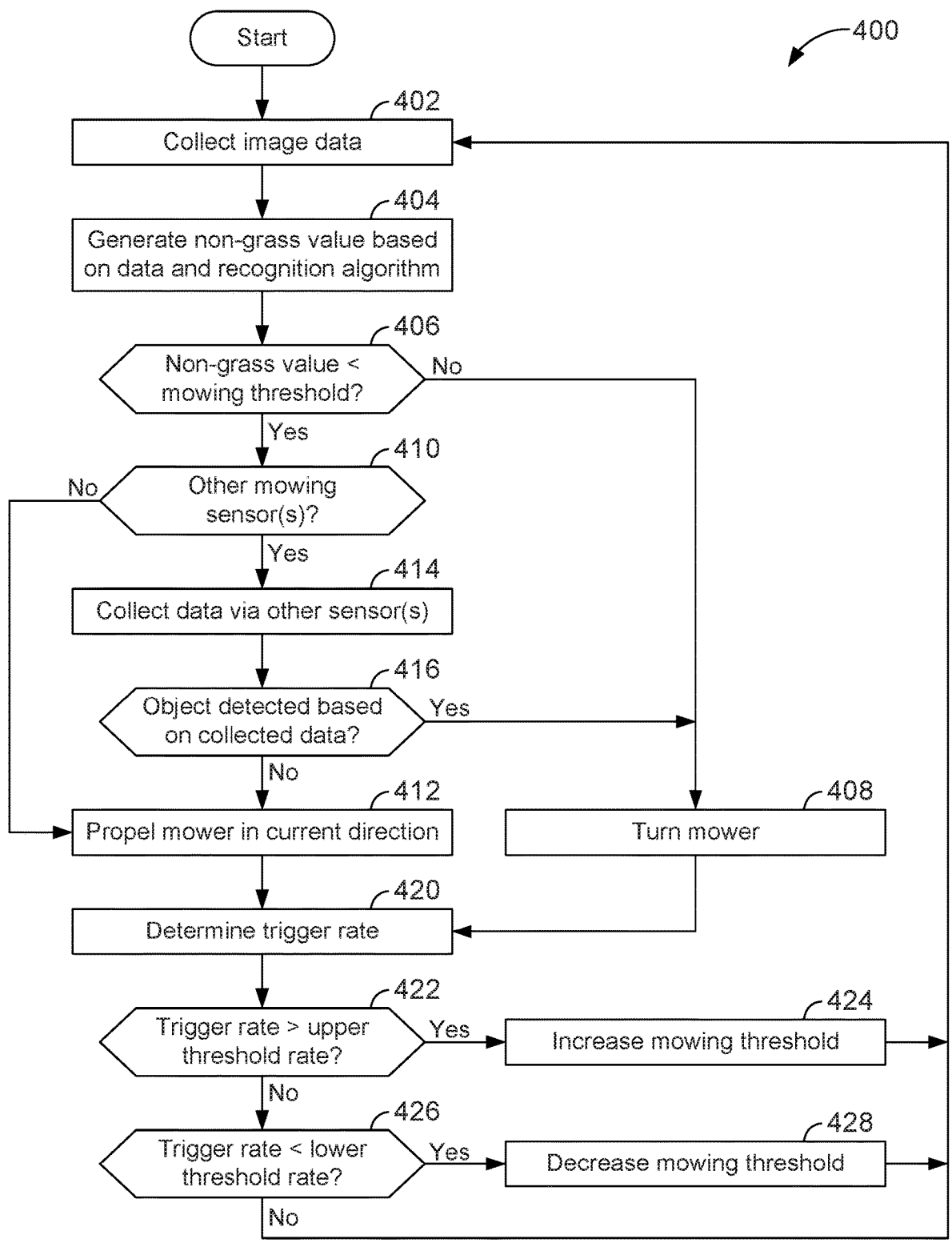
FIG. 4 is another exemplary process that the autonomous lawn mower of FIG. 1 executes to automatically adjust a sensitivity for steering purposes.

FIG. 4 is a flowchart of another exemplary method 400 to automatically adjust sensitivity of an image-recognition system of an autonomous mower. The flowchart is representative of machine readable instructions that are stored in memory and include one or more programs that, when executed by a processor (such as the main processor 102, the drive controller 103, the blade controller 104, and/or the vision processor 115 of FIG. 1), cause the autonomous mower to perform in accordance with method 400. While the exemplary program is described with reference to the flowchart illustrated in FIG. 4, many other methods of automatically adjusting sensitivity of an image-recognition system of an autonomous mower may alternatively be used. For example, the order of execution of the blocks may be rearranged, changed, eliminated, or combined to perform these alternate methods. Because the exemplary method 400 is disclosed in connection with the components of FIG. 1, some functions of those components will not be described in detail below.

Initially, at block 402, the vision sensor 114 and/or another sensor of the vision assembly collect image data of an area in front of and/or to the side of the lawn mower 110. At block 404, the vision processor 115 and/or the main processor 102 generate a non-grass value based on the collected image data. For example, the vision processor 115 and/or the main processor 102 submit the collected image data to a convolutional neural network and/or other image-recognition algorithm (e.g., another machine learning algorithm). For example, the non-grass value may be a whole number, a percentage, a decimal, or any other numerical representation that indicates a likelihood that unmowable terrain is in front of the lawn mower 110.

At block 406, the vision processor 115 and/or the main processor 102 compare the non-grass value to a mowing threshold. In response to the vision processor 115 and/or the main processor 102 determining that the non-grass value is not less than (i.e., is greater than or equal to) the mowing threshold, the method 400 proceeds to block 408, at which the drive system 105 autonomously turns the lawn mower 110 in a different direction. Upon completing block 408, the method 400 proceeds to block 420. Otherwise, returning to block 406, the method 400 proceeds to block 410 in response to the vision processor 115 and/or the main processor 102 determining that the non-grass value is less than the mowing threshold.

At block 410, the main processor 102 identifies whether the lawn mower 110 includes other sensor(s) for monitoring a surrounding area of the lawn mower 110. In response to the main processor 102 identifying that the lawn mower 110 does not include another such sensor, the method 400 proceeds to block 412, at which the drive system 105 autonomously propels the lawn mower 110 in its current direction (e.g., via the one or more drive motors 108). Upon completing block 412, the method 400 proceeds to block 420. Otherwise, in response to the main processor 102 identifying that the lawn mower 110 includes other such sensor(s) (e.g., the one or more collision sensors 112, the wire sensor 120, etc.), the method 400 proceeds to block 414.

At block 414, the main processor 102 collects data from those other sensor(s). At block 416, the main processor 102 determines whether an object in front of the lawn mower 110 or a boundary of a lawn is detected based on the other collected data. In response to the main processor 102 detecting an object or a lawn boundary, the method 400 proceeds to block 408, at which the drive system 105 autonomously turns the lawn mower 110 in a different direction. Upon completing block 408, the method 400 proceeds to block 420. Otherwise, in response to the main processor 102 not detecting an object or an outer lawn boundary, the method 400 proceeds to block 412, at which the drive system 105 autonomously propels the lawn mower 110 in its current direction (e.g., via the one or more drive motors 108). Upon completing block 412, the method 400 proceeds to block 420.

At block 420, the main processor 102 and/or the vision processor 115 determine a trigger rate of the lawn mower 110. For example, the trigger rate indicates (i) how often the non-grass value exceeds the mowing threshold and/or (ii) how often the lawn mower 110 performs a turning and/or other obstacle avoidance motion due to the detection of unmowable terrain within a predefined period of time.

At block 422, the main processor 102 and/or the vision processor 115 determine whether the trigger rate is greater than an upper threshold rate. In response to the main processor 102 and/or the vision processor 115 determining that the trigger rate is greater than the upper threshold rate, the method 400 proceeds to block 424, at which the main processor 102 and/or the vision processor 115 increase the mowing threshold (e.g., by a predefined increment). Upon completing block 424, the method 400 returns to block 402. Otherwise, returning to block 422, the method 400 proceeds to block 426 in response to the main processor 102 and/or the vision processor 115 determining that the trigger rate is not greater than (i.e., is less than or equal to) the upper threshold rate.

At block 426, the main processor 102 and/or the vision processor 115 determine whether the trigger rate is less than a lower threshold rate. In response to the main processor 102 and/or the vision processor 115 determining that the trigger rate is less than the lower threshold rate, the method 400 proceeds to block 428, at which the main processor 102 and/or the vision processor 115 decrease the mowing threshold (e.g., by a predefined increment). Upon completing block 428, the method 400 returns to block 402. Otherwise, returning to block 426, the method 400 returns to block 402 without adjusting the mowing threshold in response to the main processor 102 and/or the vision processor 115 determining that the trigger rate is not less than (i.e., is greater than or equal to) the lower threshold rate.

While the foregoing description details specific embodiments of the invention, those skilled in the art will appreciate that one could modify or adapt those embodiments based on the teachings herein. Accordingly, the disclosed embodiments are merely illustrative and should not limit the invention's scope.

What is claimed is:

1. An autonomous mower, comprising:
a drive system including one or more motors for propulsion and maneuvering;
one or more blades for mowing;
one or more cameras for capturing one or more images; and
one or more processors configured to:
generate a grass value by applying a machine learning algorithm to the one or more images;
instruct the drive system to maintain a direction of current movement for the autonomous mower based on a comparison between the grass value and a mowing threshold;
instruct the drive system to adjust a velocity of current movement for the autonomous mower in response to determining that the grass value is less than or equal to the mowing threshold;
determine a trigger rate that indicates how often the grass value is less than or equal to the mowing threshold within a predefined period of time;
decrease the mowing threshold by a predefined decrease increment in response to determining that the trigger rate is greater than an upper threshold rate; and
increase the mowing threshold by a predefined increase increment in response to determining that the trigger rate is less than a lower threshold rate.

2. The autonomous mower of claim 1, wherein the machine learning algorithm includes a convolutional neural network.

3. The autonomous mower of claim 1, wherein, to adjust the velocity of current movement, the drive system is configured to turn away from the direction of current movement in response to the one or more processors determining that the grass value is less than or equal to the mowing threshold.

4. The autonomous mower of claim 1, further including one or more bumper sensors.

5. The autonomous mower of claim 4, wherein the drive system is configured to turn in response to at least one of the one or more bumper sensors contacting an adjacent object.

6. The autonomous mower of claim 1, further including a wire sensor configured to detect an electromagnetic field of a wire located along a boundary of a mowing area.

7. The autonomous mower of claim 6, wherein the drive system is configured to turn in response to the wire sensor detecting the electromagnetic field of the wire.

8. The autonomous mower of claim 1, wherein the one or more processors are configured to:
prevent the mowing threshold from decreasing below a minimum threshold level; and
prevent the mowing threshold from increasing above a maximum threshold level.

9. The autonomous mower of claim 1, further including a communication module that is configured to wirelessly communicate with a mobile device to receive a user-selected threshold.

10. An autonomous mower, comprising:
a drive system including one or more motors for propulsion and maneuvering;
one or more blades for mowing;
one or more cameras for capturing one or more images; and
one or more processors configured to:
generate a non-grass value by applying a machine learning algorithm to the one or more images;
instruct the drive system to maintain a direction of current movement for the autonomous mower based on a comparison between the non-grass value and a mowing threshold;
instruct the drive system to adjust a velocity of current movement for the autonomous mower in response to determining that the non-grass value is greater than or equal to the mowing threshold;
determine a trigger rate that indicates how often the non-grass value is greater than or equal to the mowing threshold within a predefined period of time;
decrease the mowing threshold by a predefined decrease increment in response to determining that the trigger rate is lower than a lower threshold rate; and
increase the mowing threshold by a predefined increase increment in response to determining that the trigger rate is greater than an upper threshold rate.

11. The autonomous mower of claim 10, wherein the machine learning algorithm includes a convolutional neural network.

12. The autonomous mower of claim 10, wherein, to adjust the velocity of current movement, the drive system is configured to turn away from the direction of current movement in response to the one or more processors determining that the non-grass value is greater than or equal to the mowing threshold.

13. The autonomous mower of claim 10, further including one or more bumper sensors.

14. The autonomous mower of claim 13, wherein the drive system is configured to turn in response to at least one of the one or more bumper sensors contacting an adjacent object.

15. The autonomous mower of claim 10, further including a wire sensor configured to detect an electromagnetic field of a wire located along a boundary of a mowing area.

16. The autonomous mower of claim 15, wherein the drive system is configured to turn in response to the wire sensor detecting the electromagnetic field of the wire.

17. The autonomous mower of claim 10, wherein the one or more processors are configured to:
prevent the mowing threshold from decreasing below a minimum threshold level; and
prevent the mowing threshold from increasing above a maximum threshold level.

18. The autonomous mower of claim 10, further including a communication module that is configured to wirelessly communicate with a mobile device to receive a user-selected threshold.

* * * * *